(12) United States Patent
Clochard et al.

(10) Patent No.: US 10,647,352 B2
(45) Date of Patent: May 12, 2020

(54) OPTICAL DETECTION OF THE POSITION OF THE STEERING WHEEL

(71) Applicants: Continental Automotive France, Toulouse (FR); Continental Automotive GmbH, Hannover (DE)

(72) Inventors: Pascal Clochard, Chevreuse (FR); Jérôme Wroblewski, Mainvilliers (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/077,595

(22) PCT Filed: Feb. 17, 2017

(86) PCT No.: PCT/FR2017/050352
§ 371 (c)(1),
(2) Date: Aug. 13, 2018

(87) PCT Pub. No.: WO2017/140988
PCT Pub. Date: Aug. 24, 2017

(65) Prior Publication Data
US 2019/0054954 A1 Feb. 21, 2019

(30) Foreign Application Priority Data
Feb. 18, 2016 (FR) ..................... 16 51313

(51) Int. Cl.
*G01J 3/00* (2006.01)
*B62D 15/02* (2006.01)
(Continued)

(52) U.S. Cl.
CPC ........... *B62D 15/021* (2013.01); *B62D 1/046* (2013.01); *B62D 1/06* (2013.01); *G01D 5/40* (2013.01); *B62D 1/184* (2013.01)

(58) Field of Classification Search
CPC ........ G01N 21/3581; G01J 2005/0077; H04N 5/33
See application file for complete search history.

(56) References Cited

U.S. PATENT DOCUMENTS 9,483,692 B2 * 11/2016 Kondou ................. G06F 3/017
2008/0234899 A1 * 9/2008 Breed ................... B60N 2/002
701/47
(Continued)

FOREIGN PATENT DOCUMENTS

DE 102013013166 A1 2/2015
JP 2013218391 A * 10/2013

OTHER PUBLICATIONS

Machine Translation of JP 2013-218391 A (Year: 2013).*
(Continued)

*Primary Examiner* — David P Porta
*Assistant Examiner* — Mamadou Faye
(74) *Attorney, Agent, or Firm* — RatnerPrestia

(57) ABSTRACT

A system for detecting the position of a steering wheel of a motor vehicle, the system includes: a matrix-array optical detecting device, of the type known as a time-of-flight camera, enabling three-dimensional detection, the device including an infrared light source and a matrix-array optical sensor; and optical reference elements arranged on the rim of the steering wheel, on the side opposite the driver, the matrix-array optical detecting device being arranged in an instrument panel of the vehicle, and being configured to detect the optical reference elements on the steering wheel, and to deduce therefrom the adjustment position of the steering wheel at least depthwise.

11 Claims, 4 Drawing Sheets

(51) Int. Cl.
  *B62D 1/04* (2006.01)
  *B62D 1/06* (2006.01)
  *G01D 5/40* (2006.01)
  *B62D 1/184* (2006.01)

(56) References Cited

U.S. PATENT DOCUMENTS

2013/0063336 A1   3/2013   Sugimoto et al.
2013/0076615 A1   3/2013   Iao
2014/0270352 A1   9/2014   Fujimura

OTHER PUBLICATIONS

International Search Report and Written Opinion for International Application No. PCT/FR2017/050352, dated May 19, 2017—8 pages.

\* cited by examiner

OPTICAL DETECTION OF THE POSITION OF THE STEERING WHEEL

CROSS REFERENCE TO RELATED APPLICATIONS

This application is the U.S. National Phase Application of PCT International Application No. PCT/FR2017/050352, filed Feb. 17, 2017, which claims priority to French Patent Application No. 1651313, filed Feb. 18, 2016, the contents of such applications being incorporated by reference herein.

FIELD OF THE INVENTION

The present invention relates to systems and methods for optically detecting the position of the steering wheel in a motor vehicle.

BACKGROUND OF THE INVENTION

It is already well known to place control buttons in the spokes of the steering wheel that connect the central portion to the rim of the steering wheel, for example in order to control communication and/or audio functions or even the speed limiting/regulating function.

However, in the context of increasingly elaborate human-machine interfaces, this solution lacks flexibility because the buttons are often dedicated. Thus, touch zones have been provided on one or more spokes of the steering wheel as an alternative to control buttons.

Road safety requires the hands to be kept on the steering wheel or in immediate proximity to the latter.

It has also been proposed to detect, by means of a camera, certain gestures made by the fingers of the driver when the hand of the driver is in the vicinity of the steering wheel. However, the precision of such a detection leaves something to be desired.

Specifically, it is common to make provision for depthwise and also heightwise adjustment of the steering wheel in an automobile. Therefore, the position of the steering wheel may typically vary by up to 10 centimeters in the depth direction, and up to 10 centimeters in the height direction. These depthwise and heightwise adjustments are conventionally controlled manually and the adjustment position is not known electronically. Therefore, camera-based detecting devices that are able to detect finger movements may often deliver an ambiguous interpretation of the wish expressed by the driver.

SUMMARY OF THE INVENTION

The inventors have identified a need to improve the optical detection of certain gestures made by the driver with respect to the steering wheel, and in particular with respect to the rim of the steering wheel.

To this end, a system is provided for detecting the position of a steering wheel of a motor vehicle, the steering wheel being equipped with a system for adjusting position, at least depthwise, the system comprising:
  a matrix-array optical detecting device, of the type known as a time-of-flight camera (or ToF camera), enabling three-dimensional detection, a particularly simplified version of which comprises an infrared light source and a matrix-array optical sensor; and
  optical reference elements arranged on the rim of the steering wheel, on the side opposite the driver, the matrix-array optical detecting device being arranged in proximity to or in an instrument panel of the vehicle, and being configured to detect the optical reference elements on the steering wheel, and to deduce therefrom the adjustment position of the steering wheel at least depthwise.

By virtue of such a system, the adjustment position of the steering wheel, in particular depthwise, may be determined, in order to be able to continuously correct the position (the positions) of the zone of interest in which the finger movements are observed.

Advantageously, the driver keeps his hands on or in immediate proximity to the steering wheel, and may make control gestures while keeping good control of the steering wheel.

In various embodiments of the method according to an aspect of the invention, recourse may furthermore possibly be made to any and/or all of the following provisions:
  the reference elements comprise at least 3 almost-point-like optical reference marks, each preferably with a different shape; thus, these almost-point-like optical reference marks are easy to isolate and locate, and it is easy to reconstruct the position of the steering wheel geometrically;
  the steering wheel has a neutral position corresponding to driving in a straight line, and one of the almost-point-like optical reference marks is located in the highest position when the steering wheel is in neutral position; in this way it is easy to pinpoint this marker and to determine the angle of rotation of the steering wheel;
  the reference elements are placed substantially on an arcuate curve following the rim of the steering wheel; advantageously, a pseudo-center of this curved arc may be reconstructed and the current heightwise adjustment of the steering wheel deduced therefrom;
  the optical reference elements may comprise mirror elements and/or light traps; this allows them to be easily distinguished from other surrounding objects that reflect infrared rays to a greater or lesser extent;
  provision is made for a correlated analysis of the light echoes with respect to the infrared light, which is emitted in a pulsed manner, the observed phase difference allowing the distance of the optical reference elements with respect to the matrix-array optical sensor to be calculated; thus, the principle of "time-of-flight" cameras, which type of camera enables three-dimensional detection, is capitalized on to obtain depth distances;
  the heightwise adjustment position of the steering wheel and/or the depthwise adjustment position may be determined via geometric processing of the captured images and/or via the result of distance measurements obtained via the "time-of-flight/propagation" method; it is thus possible to compare the distance data to, and to confirm the latter with, obtained data on the apparent diameter and on the position of the center.

Moreover, an aspect of the invention also relates to a method for detecting the position of a steering wheel of a motor vehicle, in particular the heightwise position and/or the depthwise position, in a detecting system comprising a matrix-array optical detecting device of the type known as a time-of-flight camera, said device including an infrared light source and a matrix-array optical sensor, said system also comprising optical reference elements that are arranged on the rim of the steering wheel, on the side opposite the driver, the method comprising the following steps:

making a source emit modulated infrared light;

detecting, with the matrix-array optical sensor, the light echoes reflected or trapped by the optical reference elements;

carrying out calculations allowing phase difference to be determined at each point on the matrix array and the distance between the matrix-array optical sensor and the various optical reference elements on the rim of the steering wheel to be deduced therefrom; and deducing therefrom the heightwise position and/or the depthwise position of the steering wheel.

The angular position of the steering wheel may also furthermore be determined by the detection of the position of a "zero-ref" reference mark. Obtainments or correlation of the position of the steering wheel (adjustment and angular position) with other means is not ruled out.

In this method the position of the one or more zones of observation ZC of movements of fingers is continuously recalculated.

BRIEF DESCRIPTION OF THE DRAWINGS

Other aspects, aims and advantages of aspects of the invention will become apparent on reading the following description of one of its embodiments, which embodiment is given by way of nonlimiting example. Aspects of the invention will also be better understood in light of the appended drawings, in which.

DETAILED DESCRIPTION OF THE PREFERRED EMBODIMENTS

Figure 1:
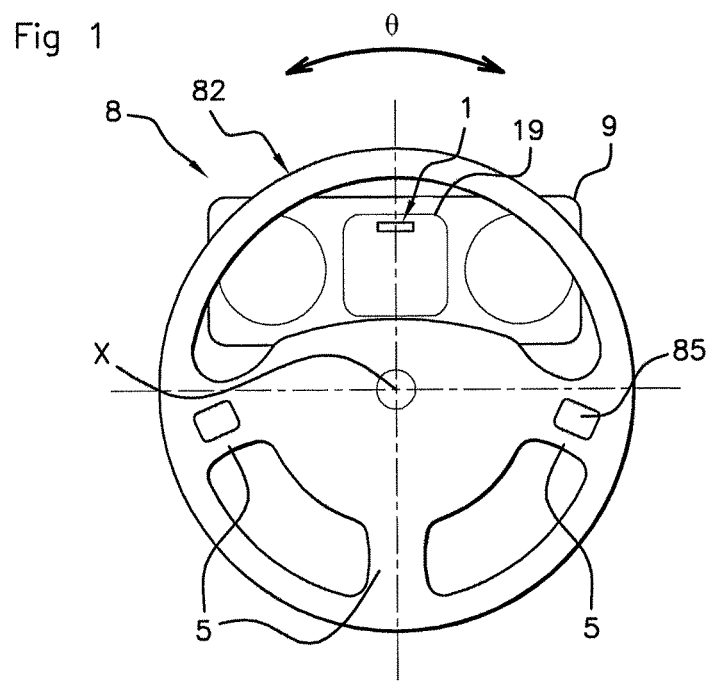
FIG. 1 shows a general schematic, seen face-on, of an automobile cockpit.

FIG. 1 shows the central zone of the cockpit from the point of view of the driver (in a situation of driving in a straight line). In the cockpit, facing the driver, there is an instrument panel 9 that, in the present case, includes a (or more than one) (LCD or pixelated) digital display zone(s) 19, and a steering wheel 8 for steering the vehicle, the steering wheel 8 being mounted so as to be able to rotate about the axis X (movement referenced by the variable θ) and comprising a rim 82. The instrument panel 9 forms a display device that may furthermore comprise various status lights, indicator lights, and dials, which are known per se.

Moreover, other display devices and other control devices are located in the general field of view of the driver. The driver may be led to interact with a plurality of on-board systems integrated into the vehicle, such as for example the vehicle audio, the multimedia system, the air-conditioning, the distance-regulating system, etc.

In the application illustrated here, the steering wheel 8 and the instrument panel 9 serve as a vector for expressing orders and commands that the driver wants to give to various on-board electronic systems.

Figure 2:
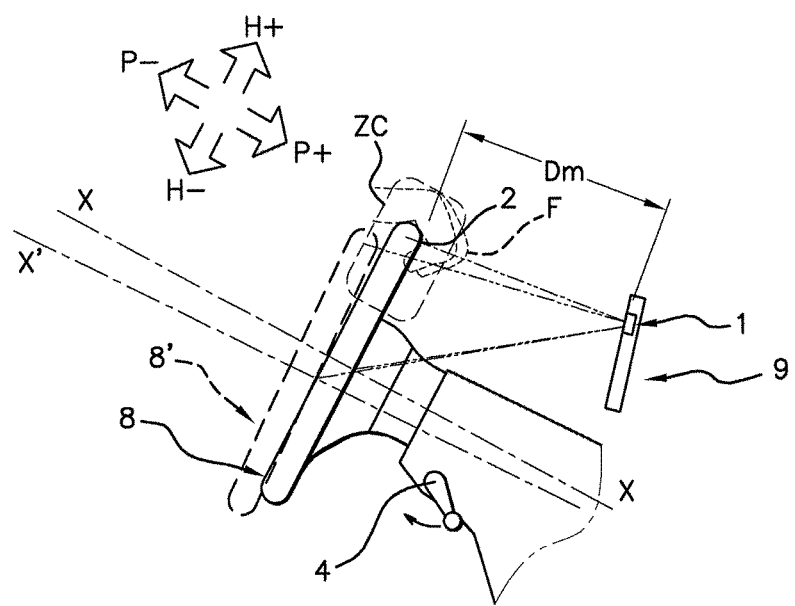
FIG. 2 shows a schematic cross-sectional view of the cockpit of FIG. 1.

Moreover, a conventional system for adjusting the position of the steering wheel 8 comprises an unlocking handle 4 that, when it is activated, permits a depthwise movement in the directions P+ and P− and a heightwise movement in the directions H+ and H− (see FIG. 2). In the example, one position of the steering wheel 8 has been shown with solid lines, and another position with dashed lines 8'.

It will be noted that the position of the steering wheel 8 is preferably adjusted when the driver first sits in the driving seat, before turning the engine on. However, the method and system presented here may also function if the driver corrects the position adjustment during the driving cycle.

The steering wheel 8 comprises a central segment, called the hub, and a rim 82, which is connected by means of three spokes 5 in the illustrated example, however the number of spokes 5 may be four, or even two or a single spoke may be used. Provision is made for conventional control buttons 85 on one or more spokes 5.

In addition to conventional buttons, provision is made for a gestural interface via which the driver may manifest, with his hand (or his hands), orders and commands while keeping his hands on the steering wheel 8.

To this end, provision is made, in (or in proximity to) the instrument panel 9, for a matrix-array optical detecting device 1, of the type known as a time-of-flight camera or ToF camera, enabling three-dimensional detection.

The matrix-array optical detecting device 1 (see FIG. 5) enabling three-dimensional detection, which will simply be referred to as a "3D camera" below, comprises an infrared light source 11 and a matrix-array optical sensor 12, arranged beside each other in an integrated package. This device may be hidden in the interior of the instrument panel 9.

The light emitted by the light source is preferably not visible to the human eye, so as to prevent the driver from experiencing any glare. Typically, said light source emits infrared light of length possibly comprised between about 750 nm and about 950 nm.

Moreover, the steering wheel 8 comprises optical reference elements 2 (see FIG. 3) arranged on the rim 82 of the steering wheel 8, on the side opposite the driver. As will be seen below, these optical reference elements 2 allow the processing of the captured images, and therefore the precision and reliability of the detection, to be improved.

These optical reference elements 2 may be formed by a mirror-type reflective material, metallized or metal surface, roughened surface with or without facets, or matte black surface for example, these elements having the advantage of delivering a clear and precise echo with respect to an infrared illumination.

A reflectance that prevents saturation effects on reception is preferably chosen.

It is the reflectance ("albedo") in the infrared domain that is important here; in the visible domain, the reference elements may differ little from the rest of the steering wheel 8, or in other words, the reference elements may advantageously be discreet to the human eye.

Conversely to the mirror solution (high reflectance), these reference elements may be formed by an infrared optical trap (i.e. delivering no light echo in this frequency range).

The shape and positions of these optical reference elements will be seen below.

The matrix-array optical sensor 12 (see FIG. 5) is typically a CCD camera optionally placed behind an optical filter 16. Apart from the ability to capture an image in two dimensions, the device referred to here as a "3D camera" furthermore has an optical demodulating function allowing a third dimension, namely the depth of the object with respect to the camera, to be determined.

Figure 5:
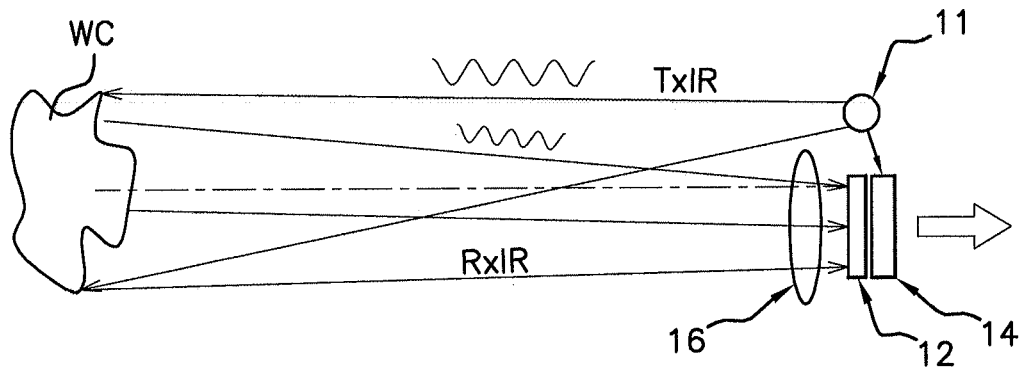
FIGS. 5, 6A and 6B show the optical detecting principle with a measurement of the phase shift related to the propagation time of light waves.
Figure 6A:
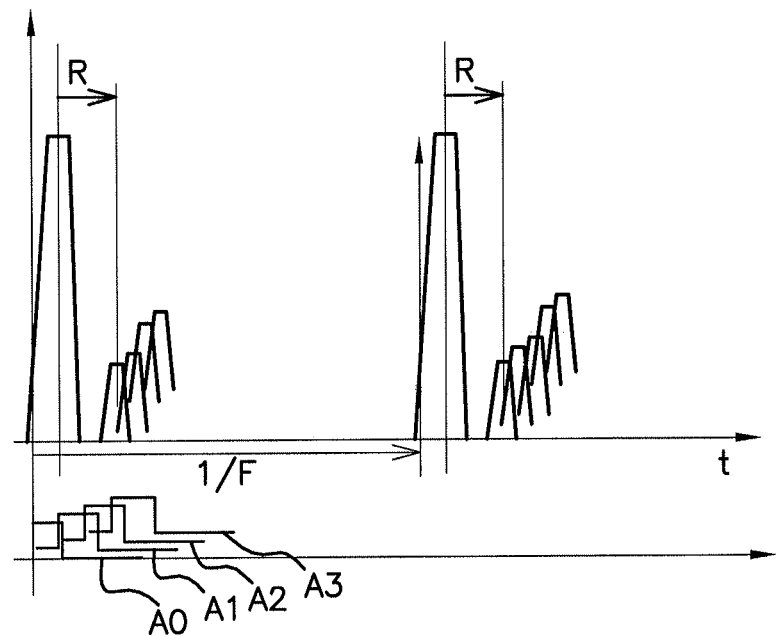
Figure 6B:
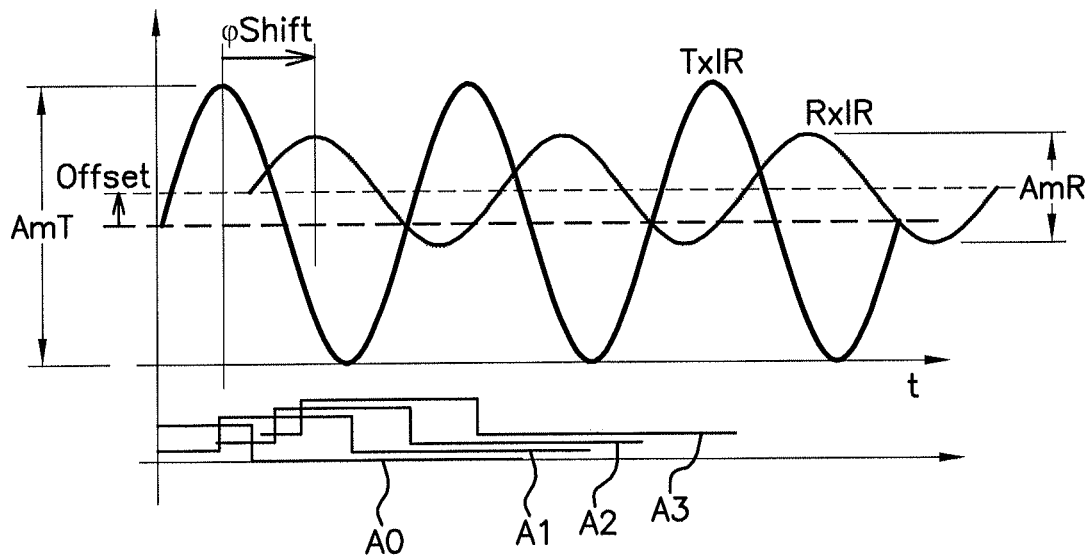

As illustrated in FIGS. 5, 6A and 6B, the infrared light source 11 emits light denoted TxIR. According to one reference solution, this light is pulsed, i.e. a pulse is sent then the echoes are analyzed to capture an image, in two dimensions and in three dimensions. One pulse is sent per image to be captured.

More precisely, the infrared light rays transmitted rebound from the observed object WC. Some of the reflected rays, denoted RxIR, travel in the direction of the matrix-array optical sensor 12, where they are compared in the time domain (for the 3-D portion) to the incident light denoted TxIR. The amplitude of the echo RxIR in particular depends on the reflectance, which must be high enough for the received echoes to be able to be captured (but without however generating saturation).

The observed delay R (see FIG. 6A) is directly proportional to the propagation time of the signal, there and back; therefore, the distance between the camera and the site of the reflection may be deduced from the observed delay.

As a variant, the emitted light may be modulated, and in this case the observed delay φShift may be determined as a phase shift. Of course, the reflected signal is observed to have an amplitude AmR different from the emitted amplitude AmT, often a general offset and the phase shift denoted φShift that is in particular of interest here.

For each point on the matrix-array optical sensor, four time windows that are offset with respect to one another are opened (see FIGS. 6A and 6B).

For each point of the matrix-array optical sensor, correlation coefficients, referred to as A0 A1 A2 and A3, and which correspond to the echo signal received in each of the four offset time windows, are calculated.

In the case of a modulated signal, this may be restated as follows.

A0 is the result of a correlation between the received signal and a signal in phase with the transmitted signal.

A1 is the result of a correlation between the received signal and a signal delayed by $\pi/2$ with respect to the transmitted signal (delay with respect to the modulating angular frequency).

A2 is the result of a correlation between the received signal and a signal delayed by $\pi$ with respect to the transmitted signal.

A3 is the result of a correlation between the received signal and a signal delayed by $3\pi/2$ with respect to the transmitted signal.

A detailed example calculation is given in document US 2014 0 160 459 to which the reader may refer. What is in particular of interest here is the phase shift, which is given by:

$$\varphi Shift = Artan(A3-A1/A0-A2),$$

the distance then being calculated as follows:

$$Dm = c \times \varphi Shift/2$$

Cases in which the quotient of the arctangent gives 0/0 or indeed ∞/∞ may be excluded from 3-D processing; this is done by generating masks of the 2-D image that spare the high-reflection zones and light-trap zones.

Figure 4:
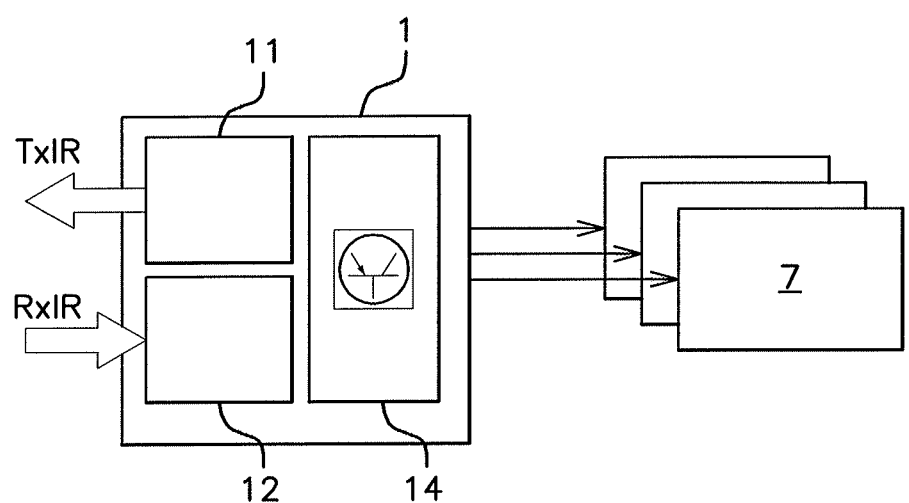
FIG. 4 shows a functional diagram of the system.

The calculations presented above are carried out by a processing unit 14, as illustrated in FIG. 4, the results being made available to other on-board computers 7.

To facilitate the algorithmic processing, provision is made, on the steering wheel 8, for particular reference elements.

Figure 3:
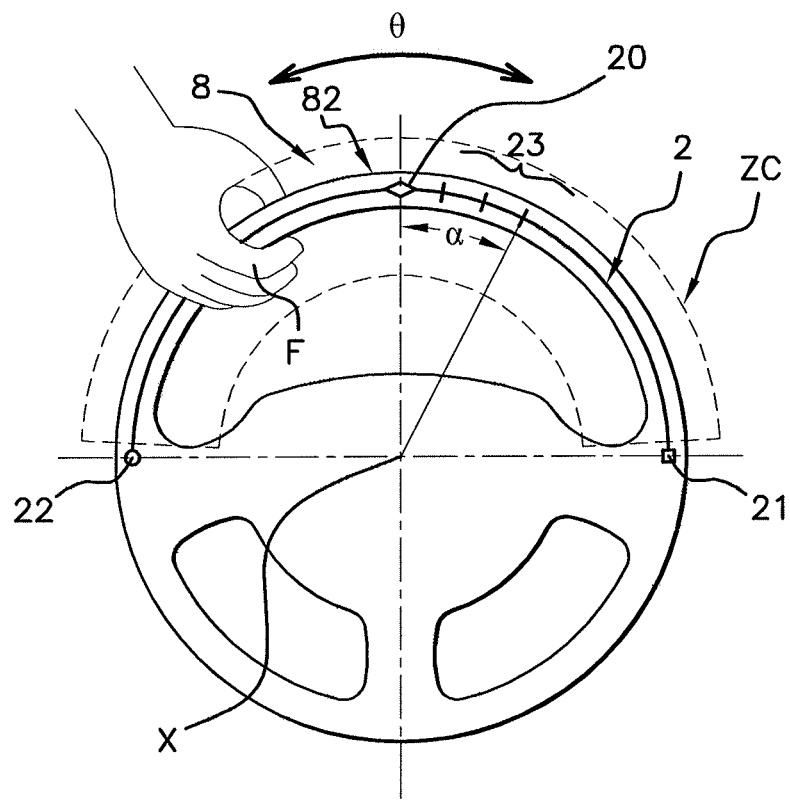
FIG. 3 shows a view of the back side of the steering wheel of FIG. 1, with reference elements.
Figure 7:
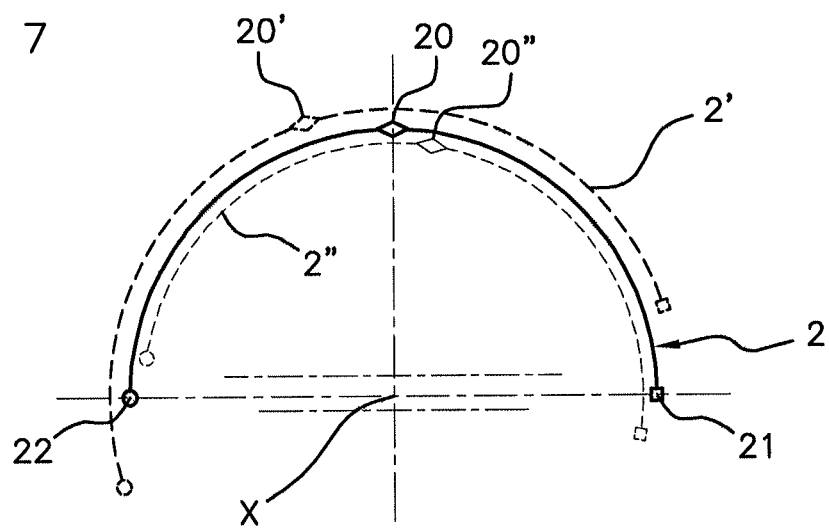
FIG. 7 shows a diagram illustrating a plurality of positions detected in a plurality of driving configurations.

For example, provision may be made, as illustrated in FIGS. 3 and 7, for a narrow, curved-arc-shaped, strip or line that is coincident with the top half of the rim 82 of the driving wheel 8 when the latter is in the position for driving in a straight line. More generally, a discontinuous or continuous, substantially curved-arc-shaped line or strip that is coincident with the portion of the rim that is furthest from the driver may be provided.

In addition, at the apex of this arc, provision is made for a particular almost-point-like reference mark 20, for example a rhombus-shaped reference mark, that will be referred to as the "zero" or the "zero reference" "zero-ref" or origin reference.

This reference position serves as origin for the angles denoted α in the local frame of reference of the steering wheel 8 independently of the rotational position given by θ.

Furthermore, provision may be made for two other specific almost-point-like reference marks, a circular reference mark referenced 22 placed at α=−90°, and a square reference mark referenced 21 at α=90°. With 3 specific almost-point-like optical reference marks, it is guaranteed that the camera will always be able to see at least one and thus will be able to continuously measure the position and distance of one or more of these reference marks.

Provision may also be made for a system 23 of graduations.

More generally, point-like reference marks with other shapes may be envisioned.

Figure 8:
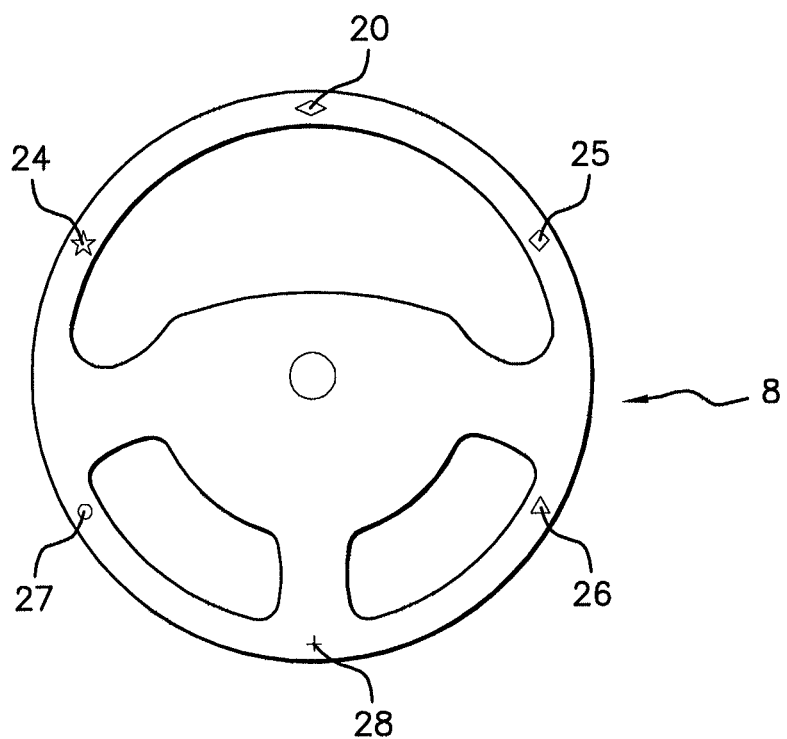
FIG. 8 is analogous to FIG. 3 and shows a variant regarding the specific optical reference marks.

According to another example illustrated in FIG. 8, provision is made for 6 specific almost-point-like optical reference marks, a rhombus 20 at α=0°, a square 25 at α=60°, a triangle 26 at α=120°, a cross 28 at α=180°, a circle 27 at α=−120°, a star 24 at α=−60°.

It will be noted that these 6 specific optical reference marks are radially opposite in pairs, thereby allowing the apparent diameter of the rim of the steering wheel 8 to be easily determined, even if one or two hands occult one or two reference marks.

The method uses two different approaches to determine the position of the steering wheel 8. Firstly, the positions of the optical reference elements (in particular the almost-point-like reference marks 20-28) are identified, and geometric calculations (triangulation inter alia) are carried out on the basis of the 2-D images.

Secondly, the ToF camera determines the distance that separates certain specific optical reference marks from the camera. Specific calculational processing allows the depth-wise position of the steering wheel 8 to be deduced therefrom.

The results of the two approaches are tallied and correlated in order to deduce therefrom a confirmed position of the adjustment of the steering wheel 8 heightwise and depthwise, and the angular position θ of the steering wheel 8.

In principle, the steering wheel 8 is adjusted whilst the vehicle is stopped.

In the context of interpretation of certain gestures made by the driver, a zone of observation ZC, illustrated in FIGS. 2 and 3, is defined around the rim 82 of the steering wheel 8.

It will be noted that there may be a plurality of zones of observation ZC, not only in the vicinity of the rim 82 of the steering wheel 8, but also with respect to touch pads arranged between the hub and the rim 82.

Preferably, the zone of observation encompasses the regions in which the hands of the driver are conventionally positioned when driving, for example the grip position called "9h15" or indeed the grip position called "10h10"; two-handed but asymmetric positions and single-handed positions are also commonly used by drivers.

It should be noted that the one or more zones of observation ZC turn with the rotational movement of the steering wheel 8, which movement is referenced θ.

Knowledge of the position of the steering wheel 8 heightwise, depthwise, and rotationwise about its axis X, allows, at any given time, the position of the zones of observation ZC, i.e. the position in which the gestures made by the fingers F and hands of the driver will be taken into account, to be redefined.

FIG. 7 illustrates the images captured and processed by the camera. In a first case (solid line) a median position of the steering wheel 8 (in fact of the reference marks 2, 20) heightwise and depthwise, with the steering-wheel angle θ=zero, is observed; in another case represented by the dashed lines (2', 20'), the steering wheel 8 is closer (the apparent diameter is larger) and the driver is turning the steering wheel 8 to the right; in yet another case represented by the dot-dashed line (2", 20"), the steering wheel 8 is further away (the apparent diameter is smaller) and the driver is turning the steering wheel 8 to the left.

The fingers of the hand of the driver are designated by the reference F. It will be noted that even with the presence of the fingers F of one hand on the steering wheel, this does not prevent the detecting method from functioning in most cases. Specifically, on the one hand, during an adjusting operation, the driver has only one hand on the steering wheel and the other on the unlocking handle 4, and on the other hand, the probability that more than one particular point-like reference mark will be occulted by the fingers F is relatively small; to this end, provision is made, if one or more of the particular markers or reference marks are occulted, to preserve the current depth P and height H for the position of the steering wheel 8, and to make do with continuing to determine the angle θ and with continuing to reposition rotationwise about the axis of the steering wheel 8 the zone of observation ZC of the steering wheel 8.

Figure 9:
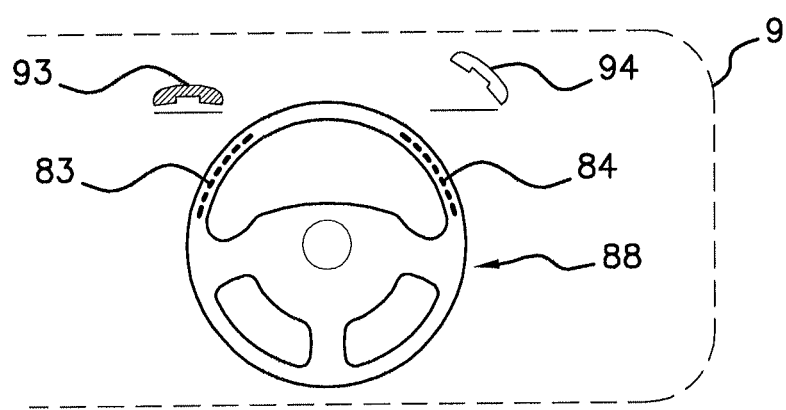
FIG. 9 shows an example of functional use.

By way of application, provision may be made, as illustrated in FIG. 9, to display, on the instrument panel 9, pictograms 88, 93, 94 that are illustrative of the human-machine interface; under certain conditions, a particular gesture, made by the right hand of the driver in the zone referenced 84, leads to a telephone call being taken, and a particular gesture made by the left hand of the driver in the zone referenced 83 causes the telephone call to be ended.

It will moreover be noted that the system according to an aspect of the invention operates effectively both during the day and at night, the camera being chosen to be sensitive to infrared light, without direct link to the ambient light level.

It will be noted that, advantageously, no active electronic components are required in the steering wheel 8 for the optical detecting function; the reference elements are completely passive; the system is therefore particularly simple and does not require electrical signals to be transmitted between the steering wheel 8, which turns, and the rest of the vehicle.

It is possible to employ infrared components centered on 850 nm if the source is not visible from the normal point of view of the driver, or indeed to employ infrared components centered on 940 nm, which has the advantage of being completely imperceptible to the human eye; the difference in the power emitted by these two different types of diode has no impact given the small distance in this application.

The invention claimed is:

1. A system for detecting the position of a steering wheel of a motor vehicle, the steering wheel being equipped with a system for adjusting position, at least depthwise, the system comprising: a matrix-array optical detecting device, as a time-of-flight camera, enabling three-dimensional detection, said device including an infrared light source and a matrix-array optical sensor; and optical reference elements arranged on a rim of the steering wheel, on a side opposite the driver, the matrix-array optical detecting device being arranged in proximity to or in an instrument panel of the vehicle, the device being configured to optically detect the optical reference elements on the steering wheel, and determine a position of the steering wheel at least in a depthwise direction of the steering wheel relative to the driver based on the optical detection and the distance between the matrix-array optical detecting device and the optical reference elements on the steering wheel.

2. The system as claimed in claim 1, wherein the optical reference elements comprise at least 3 almost-point-like optical reference marks.

3. The system as claimed in claim 2, wherein the steering wheel has a neutral position corresponding to driving in a straight line, and one of the almost-point-like optical reference marks is located in a highest position when the steering wheel is in the neutral position.

4. The system as claimed in claim 1, wherein the optical reference elements are placed substantially on an arcuate curve following the rim of the steering wheel.

5. The system as claimed in claim 4, wherein the optical reference elements comprise mirror elements and/or light traps.

6. The system as claimed in claim 1, wherein provision is made for a correlated analysis of the light echoes with respect to the infrared light, which is emitted in a pulsed manner, the observed phase difference allowing the distance of the optical reference elements with respect to the matrix-array optical sensor to be calculated.

7. The system as claimed in claim 1, wherein the heightwise adjustment position of the steering wheel and/or the depthwise adjustment position may be determined via geometric processing of the captured images and/or via the result of distance measurements obtained via a "time-of-flight/propagation" method.

8. A method for detecting the position of a steering wheel of a motor vehicle, in a heightwise position and a depthwise position, in a detecting system comprising a matrix-array optical detecting device as a time-of-flight camera, said device including an infrared light source and a matrix-array optical sensor, said system also comprising optical reference elements that are arranged on a rim of the steering wheel, on the side opposite the driver, the method comprising:

making a source emit modulated infrared light;

optically detecting, with the matrix-array optical sensor, the light echoes reflected by the optical reference elements;

carrying out calculations allowing a phase difference to be determined at each point on the matrix array and a distance between the matrix-array optical sensor and the various optical reference elements on the rim of the steering wheel to be deduced therefrom; and determining the heightwise position and the depthwise position of the steering wheel relative to the driver based on the optical detection and the distance between the matrix-array optical sensor and the various optical reference elements.

9. The method as claimed in claim 8, wherein an angular position of the steering wheel is furthermore determined via detection of one or more almost-point-like optical reference marks.

10. The method as claimed in claim 8, wherein a position of the one or more zones of observation of movements of fingers is continuously recalculated.

11. The system as claimed in claim 1, wherein the optical reference elements comprise at least three almost-point-like optical reference marks, each reference mark having a different shape.

* * * * *